US010146671B2

United States Patent
Fujiwara et al.

(10) Patent No.: US 10,146,671 B2
(45) Date of Patent: Dec. 4, 2018

(54) TESTING OF SOFTWARE UPGRADE

(71) Applicant: INTERNATIONAL BUSINESS MACHINES CORPORATION, Armonk, NY (US)

(72) Inventors: Seiei Fujiwara, Chiba (JP); Kazumasa Kawaguchi, Chiba (JP); Reona Kondoh, Chiba (JP); Kenji Sasaki, Chiba (JP); Hiroshi Yoshioka, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 416 days.

(21) Appl. No.: 14/865,944

(22) Filed: Sep. 25, 2015

(65) Prior Publication Data

US 2017/0091069 A1    Mar. 30, 2017

(51) Int. Cl.
*G06F 9/445*    (2018.01)
*G06F 11/36*    (2006.01)
*G06F 8/65*    (2018.01)

(52) U.S. Cl.
CPC .............. *G06F 11/368* (2013.01); *G06F 8/65* (2013.01); *G06F 11/3692* (2013.01)

(58) Field of Classification Search
CPC .............. G06F 11/3664; G06F 11/3672; G06F 11/3676; G06F 11/3612; G06F 11/3692; G06F 11/3668
See application file for complete search history.

(56) References Cited

U.S. PATENT DOCUMENTS

| | | | |
|---|---|---|---|
| 7,614,046 B2 | 11/2009 | Daniels et al. | |
| 8,745,611 B2 | 6/2014 | Saraf et al. | |
| 8,990,778 B1 | 3/2015 | Allocca et al. | |
| 9,916,233 B1* | 3/2018 | Qureshi | G06F 9/45533 |
| 2009/0106424 A1* | 4/2009 | Safari | G06F 11/1433 709/226 |
| 2010/0257513 A1 | 10/2010 | Thirumalai et al. | |
| 2013/0247010 A1* | 9/2013 | Bradbury | G06F 9/3005 717/130 |
| 2015/0007332 A1 | 1/2015 | Satish et al. | |
| 2015/0058822 A1 | 2/2015 | Elias et al. | |
| 2015/0162092 A1* | 6/2015 | Haukness | G11C 16/32 711/103 |

OTHER PUBLICATIONS

Luis Pina and Joao Cachopo, Atomic Dynamic Upgrades Using Software Transactional Memory, IEEE, 2012, retrieved online on Jul. 26, 2018, pp. 21-25. Retrieved from the Internet: <URL: http://delivery.acm.org/10.1145/2670000/2664355/p21-pina.pdf?>. (Year : 2012).*
Cadar, C; Hosek, P.; Multi-Version Software Updates; Jun. 3, 2012; pp. 36-40.

* cited by examiner

*Primary Examiner* — Hanh Thi-Minh Bui
(74) *Attorney, Agent, or Firm* — Isaac J. Gooshaw, Esq.; George S. Blasiak, Esq.; Hesli Rothenberg Farley & Mesiti, P.C.

(57) ABSTRACT

Methods, computer program products, and systems are presented. There can be provided inputting a set of test transactions into a shadow production system, wherein providing of a set of test transactions includes modifying of a set of transactions of a production system, and obtaining a result of the inputting.

18 Claims, 11 Drawing Sheets

MISMATCH OUTPUT MESSAGE

| TRANSACTIONAL SERIAL NUMBER | SYSTEM TIME OF EXECUTION | |
|---|---|---|
| 20 | 2014/4/14 10:23:03.466 | 124089..HITOSHI..NAKAMOTO6MAA20.ITS<br>--------<br>FFFFFF00CCEDECC00DCDCDDEDFDCCFF0CEE4444444<br>1240890789362890851214636641120093320000000 |
| | 2014/4/14 10:23:04.785 | 124089..HITOSHI..NAKAMOTOHITOSHI..NAKAMOTO<br>--------<br>FFFFFF00CCEDECC00DCDCDDEDCCEDECC00DCDCDDED<br>12408907893628908512146368936289085121 4636 |

FIG. 10

MISMATCH DATABASE RECORD

| TABLE NAME/ RECORD KEY | DATA CONTENTS |
|---|---|
| ON_TABLE_T01 | 124089..SYSOBDS..SYSIBM  T..DSNDB06 ..SYSALTER...T....<br>--------<br>FFFFFF00EEEDCCE00EEECCD44E00CEDCCFF400EEECDECD000E000044444444<br>124089072826242082829240030842542060082821335906230A0800000000 |
| KEY: 124089 | 124089..SYSOBDS..SYSIBM  T..DSNDB06 ..SYSA    ...T....<br>--------<br>FFFFFF00EEEDCCE00EEECCD44E00CEDCCFF400EEEC4444000E000044444444<br>124089072826242082829240030842542060082821000006230A0800000000 |

FIG. 11

| TRANSACTION SERIAL NUMBER | EXECUTION TIME (HOURS: MINUTES: SECONDS. MICRO SECONDS) | | | | CPU TIME (SECONDSCPU) | | | |
|---|---|---|---|---|---|---|---|---|
| | BEFORE | AFTER | FLUCTUATION | RATE OF CHANGE(%) | BEFORE | AFTER | FLUCTUATION | RATE OF CHANGE(%) |
| 1 | 00:00:00.220 | 00:00:00.210 | - 00:00:00.210 | -5% | 0.05 | 0.05 | 0.00 | 0% |
| 2 | 00:01:25.430 | 00:01:33.490 | 00:01:33.490 | 9% | 30.26 | 31.22 | -0.96 | 3% |
| 3 | 00:00:47.120 | 00:00:46.820 | - 00:00:46.820 | -1% | 20.83 | 20.96 | -0.13 | 1% |
| 4 | 00:00:00.310 | 00:00:00.270 | - 00:00:00.270 | -15% | 0.08 | 0.09 | -0.01 | 11% |
| 5 | 00:00:00.320 | 00:00:00.410 | 00:00:00.410 | 22% | 0.09 | 0.10 | -0.01 | 10% |
| 6 | 00:00:06.550 | 00:00:06.830 | 00:00:06.830 | 4% | 3.14 | 3.18 | -0.04 | 1% |
| 7 | 00:00:06.700 | 00:00:06.480 | - 00:00:06.480 | -3% | 3.15 | 3.18 | -0.03 | 1% |
| 8 | 00:00:32.720 | 00:00:31.820 | - 00:00:31.820 | -3% | 15.14 | 15.22 | -0.08 | 1% |
| 9 | 00:00:00.720 | 00:00:00.590 | - 00:00:00.590 | -22% | 0.12 | 0.04 | 0.08 | -200% |
| 10 | 00:00:00.140 | 00:00:00.170 | 00:00:00.170 | 18% | 0.04 | 0.06 | -0.02 | 33% |
| 11 | 00:00:22.660 | 00:00:21.140 | - 00:00:21.140 | -7% | 3.82 | 4.13 | -0.31 | 8% |
| 12 | 00:00:23.420 | 00:00:21.630 | - 00:00:21.630 | -8% | 3.90 | 4.18 | -0.28 | 7% |
| 13 | 00:00:00.350 | 00:00:00.320 | - 00:00:00.320 | -9% | 0.08 | 0.08 | 0.00 | 0% |
| 14 | 00:04:06.150 | 00:03:31.010 | - 00:03:31.010 | -17% | 58.22 | 58.42 | -0.20 | 0% |
| 15 | 00:04:18.750 | 00:03:30.540 | - 00:03:30.540 | -23% | 63.43 | 63.23 | 0.20 | 0% |
| 16 | 00:01:35.620 | 00:01:22.570 | - 00:01:22.570 | -16% | 30.32 | 31.15 | -0.83 | 3% |
| 17 | 00:00:00.300 | 00:00:00.310 | 00:00:00.310 | 3% | 0.08 | 0.08 | 0.00 | 0% |
| 18 | 00:00:03.270 | 00:00:03.330 | 00:00:03.330 | 2% | 0.66 | 0.69 | -0.03 | 4% |

FIG. 12

| ITEM | COMPARISON RESULT | BEFORE SW UPGRADE | AFTER SW UPGRADE |
|---|---|---|---|
| START SYSTEM TIME END SYSTEM TIME | --- | 2014.04.14 09:00:00 2014.04.18 20:18:29 | 2014.04.14 09:00:00 2014.04.18 20:12:11 |
| TOTAL NUMBER OF TRANSACTIONS | MATCH | 54,206 | 54,206 |
| OUTPUT MESSAGE | MISMATCH | | ONE MISMATCH SEE DETAIL REPORT |
| USER DATABASE | MISMATCH | | ONE MISMATCH SEE DETAIL REPORT |
| EXECUTION TIME | MISMATCH (*) | | 12 MISMATCHES SEE DETAIL REPORT |
| Consumed CPU TIME | MATCH | | NO MISMATCH |

FIG. 13

TESTING OF SOFTWARE UPGRADE

TECHNICAL FIELD

The present disclosure relates to computer systems in general and particularly to testing of upgrades in a computer system.

BACKGROUND

Regular upgrades to computer systems are critical to survival and success of an enterprise. Upgrades can include upgrades in software and infrastructure. While upgrades are critical, incorporating updates imposes risk. In some cases, an upgrade can be incompatible with un-upgraded features of a computer system. Therefore, users of computer systems may avoid implementing upgrades in order to assure system stability.

SUMMARY

The shortcomings of the prior art are overcome, and additional advantages are provided, through the provision, in one aspect, of a method. The method includes, for example: performing, by one or more processor, a first input of a set of test transactions into a shadow production system and a second input of the set of test transactions into the shadow production system, the first input occurring prior to a software upgrade of the shadow production system, the second input occurring after the software upgrade of the shadow production system; and comparing, by the one or more processor, a result of the first input and the second input.

In another aspect, a computer program product is provided. The computer program product includes a computer readable storage medium readable by one or more processing circuit and storing instructions for execution by one or more processor for performing a method. The method includes, for example: performing a first input of a set of test transactions into a shadow production system and a second input of the set of test transactions into the shadow production system, the first input occurring prior to a software upgrade of the shadow production system, the second input occurring after the software upgrade of the shadow production system; and comparing a result of the first input and the second input.

In a further aspect, a system is provided. The system includes, for instance a memory. In addition, the system includes one or more processor in communication with the memory. Further, the system includes program instructions executable by the one or more processor via the memory to perform a method. The method includes, for example: performing a first input of a set of test transactions into a shadow production system and a second input of the set of test transactions into the shadow production system, the first input occurring prior to a software upgrade of the shadow production system, the second input occurring after the software upgrade of the shadow production system; and comparing a result of the first input and the second input.

The shortcomings of the prior art are overcome, and additional advantages are provided, through the provision, in one aspect, of a method. The method includes, for example: inputting, by one or more processor, a set of test transactions into a shadow production system, wherein providing of the set of test transactions includes modifying of set of transactions of a production system, and obtaining, by the one or more processor, a result of the inputting.

In another aspect, a computer program product is provided. The computer program product includes a computer readable storage medium readable by one or more processor and storing instructions for execution by the one or more processor for performing a method. The method includes, for example: inputting, by one or more processor, a set of test transactions into a shadow production system, wherein providing of the set of test transactions includes modifying of a set of transactions of a production system, and obtaining a result of the inputting.

In a further aspect, a system is provided. The system includes, for instance a memory. In addition, the system includes one or more processor in communication with the memory. Further, the system includes program instructions executable by the one or more processor via the memory to perform a method. The method includes, for example: inputting, by one or more processor, a set of test transactions into a shadow production system, wherein providing of the set of test transactions includes modifying of a set of transactions of a production system, and obtaining a result of the inputting.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 10 illustrates a report outputting a comparisons between an output message resulting from input of a test transition into a pre-upgrade shadow production system and a post-upgrade shadow production system, in accordance with one or more aspects set forth herein;

FIG. 11 illustrates a report outputting a comparison between a database output resulting from input of a test transaction into a pre-upgrade shadow production system and a post-upgrade shadow production system, in accordance with one or more aspects set forth herein;

FIG. 12 illustrates a report outputting a comparison between CPU processing times resulting from input of a test transaction into a pre-upgrade shadow production system and a post-upgrade shadow production system, in accordance with one or more aspects set forth herein; and FIG. 13 illustrates a summary report outputting a comparison between various performance parameters resulting from input of a test transactions into a pre-upgrade shadow production system to various parameters resulting from input of test transactions into a post-upgrade shadow production system, in accordance with one or more aspects set forth herein.

DETAILED DESCRIPTION

Figure 1:
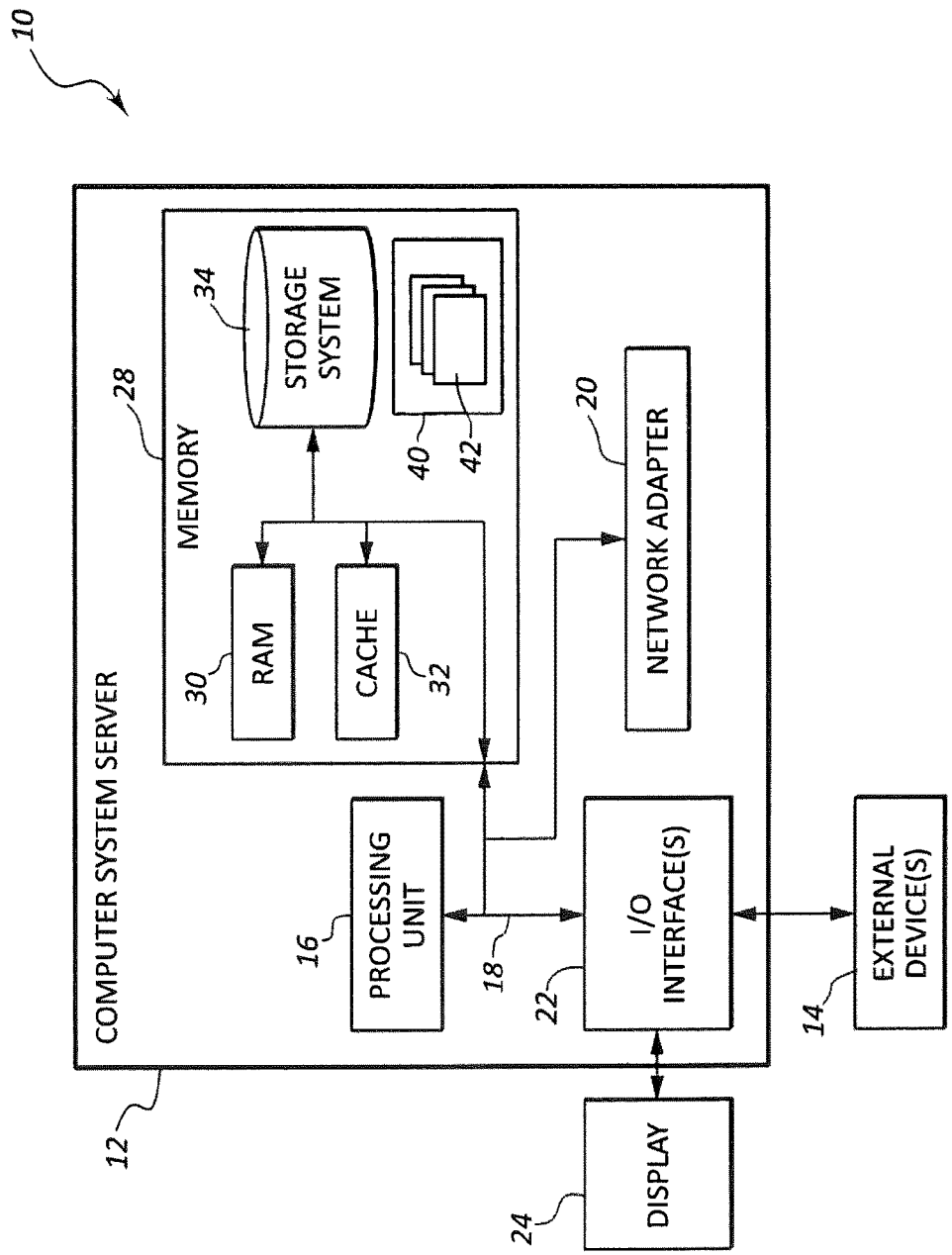
FIG. 1 depicts a cloud computing node according to an embodiment of the present invention.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer program products, systems, network devices, and virtual machine management software for testing of a software upgrade.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
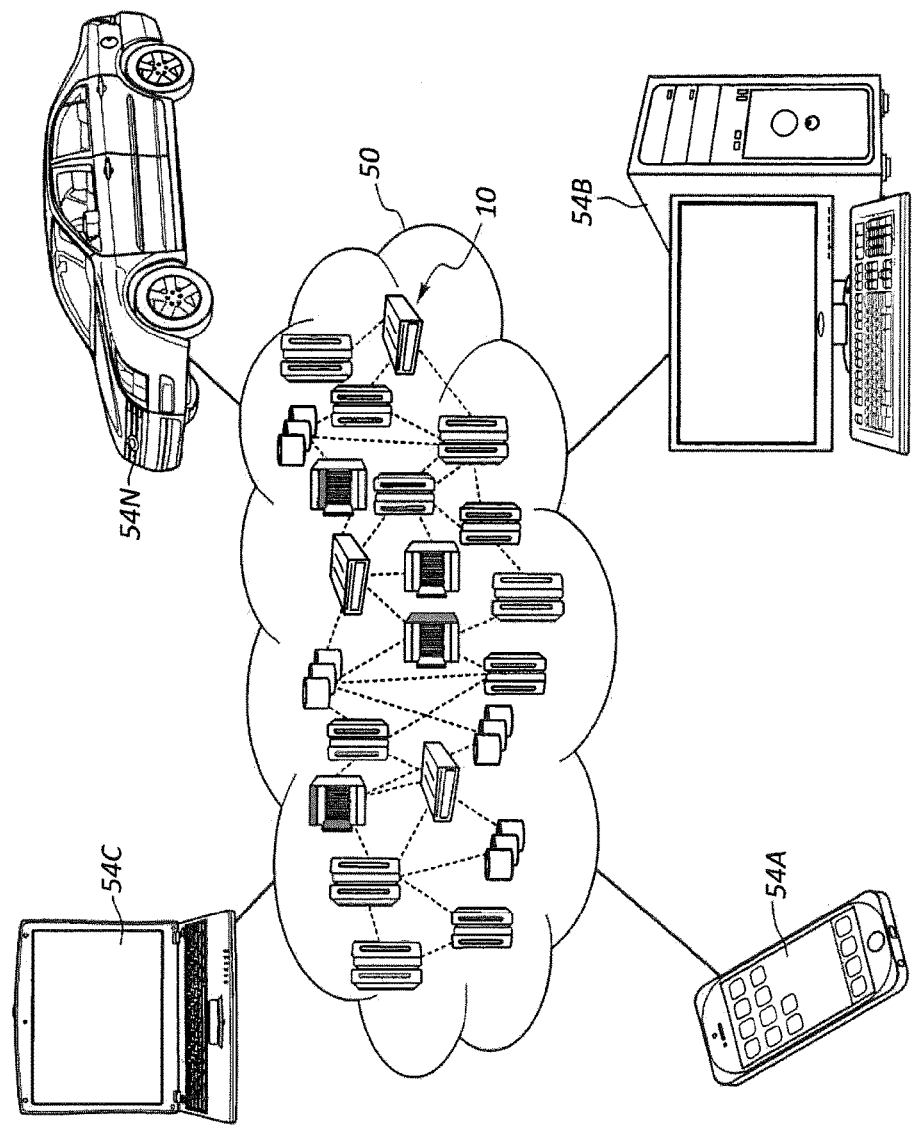
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
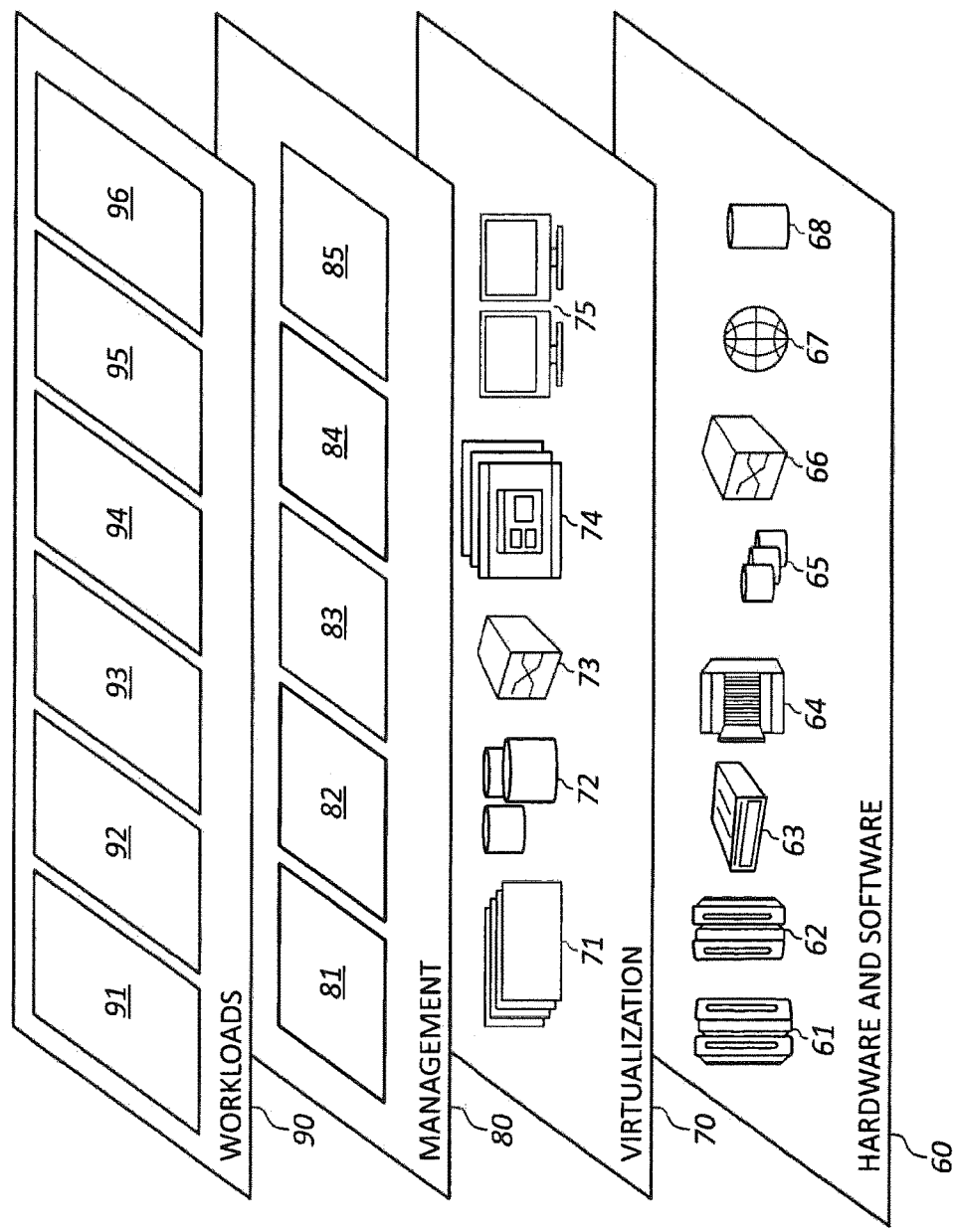
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software upgrade test resources 96 as described herein.

Figure 4:
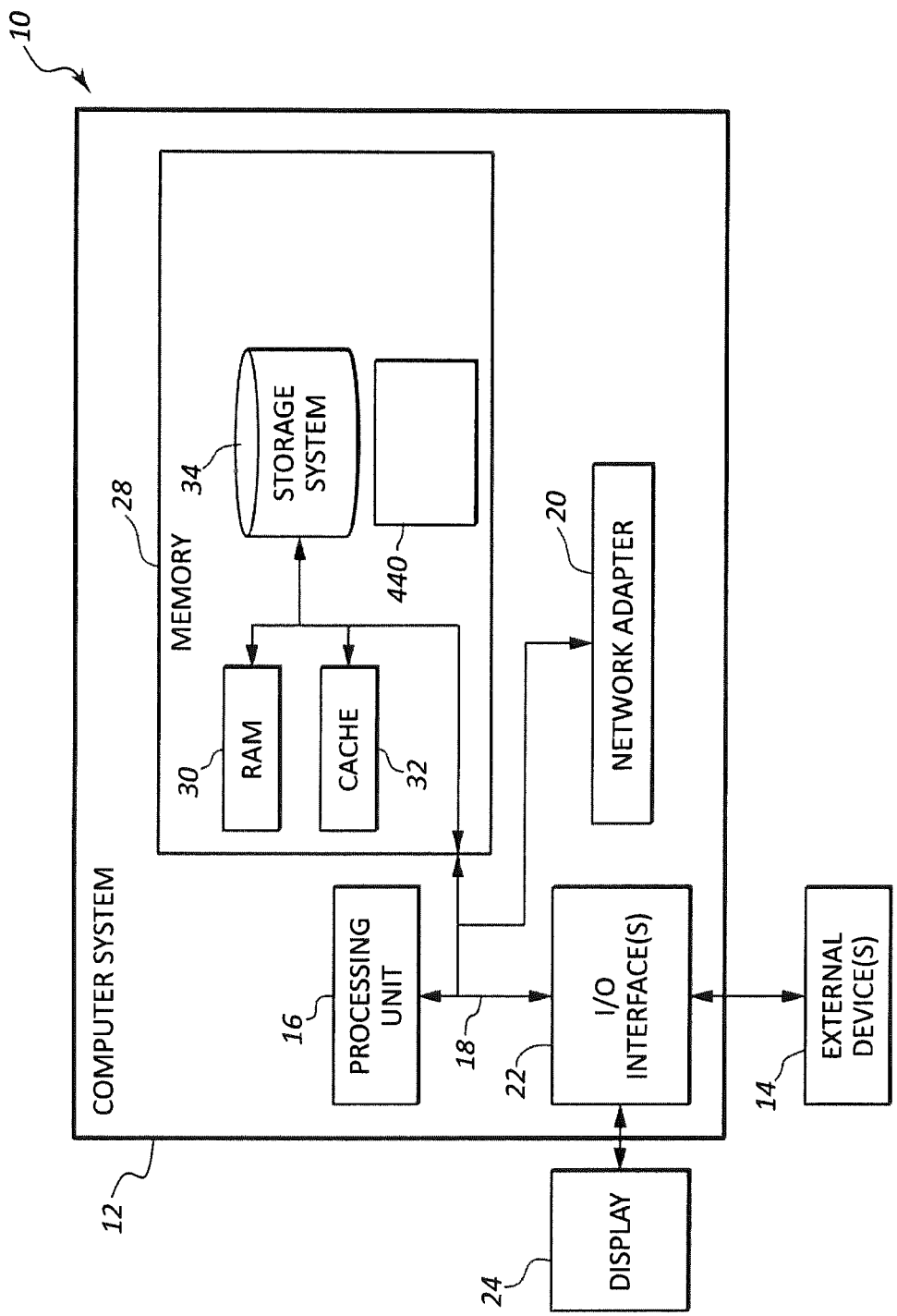
FIG. 4 depicts a hardware overview of a computing node, in accordance with one or more aspects set forth herein.

FIG. 4 depicts a hardware overview of a computing node 10, which may be a cloud computing node, in accordance with one or more aspects set forth herein. By way of example, computing node 10 may generally be any of the computing devices described herein, such as network devices, client computers, server computers, etc.

Program/utility 40 as set forth in FIG. 1 can provide the functionality of software upgrade test resources 96 as set forth in reference to FIG. 3 and can include one or more program 440 as set forth in FIG. 4.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 generally carry out the functions and/or methodologies of embodiments of the invention as described herein, such as performing a test for use in determining an effect of implementing a software upgrade.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
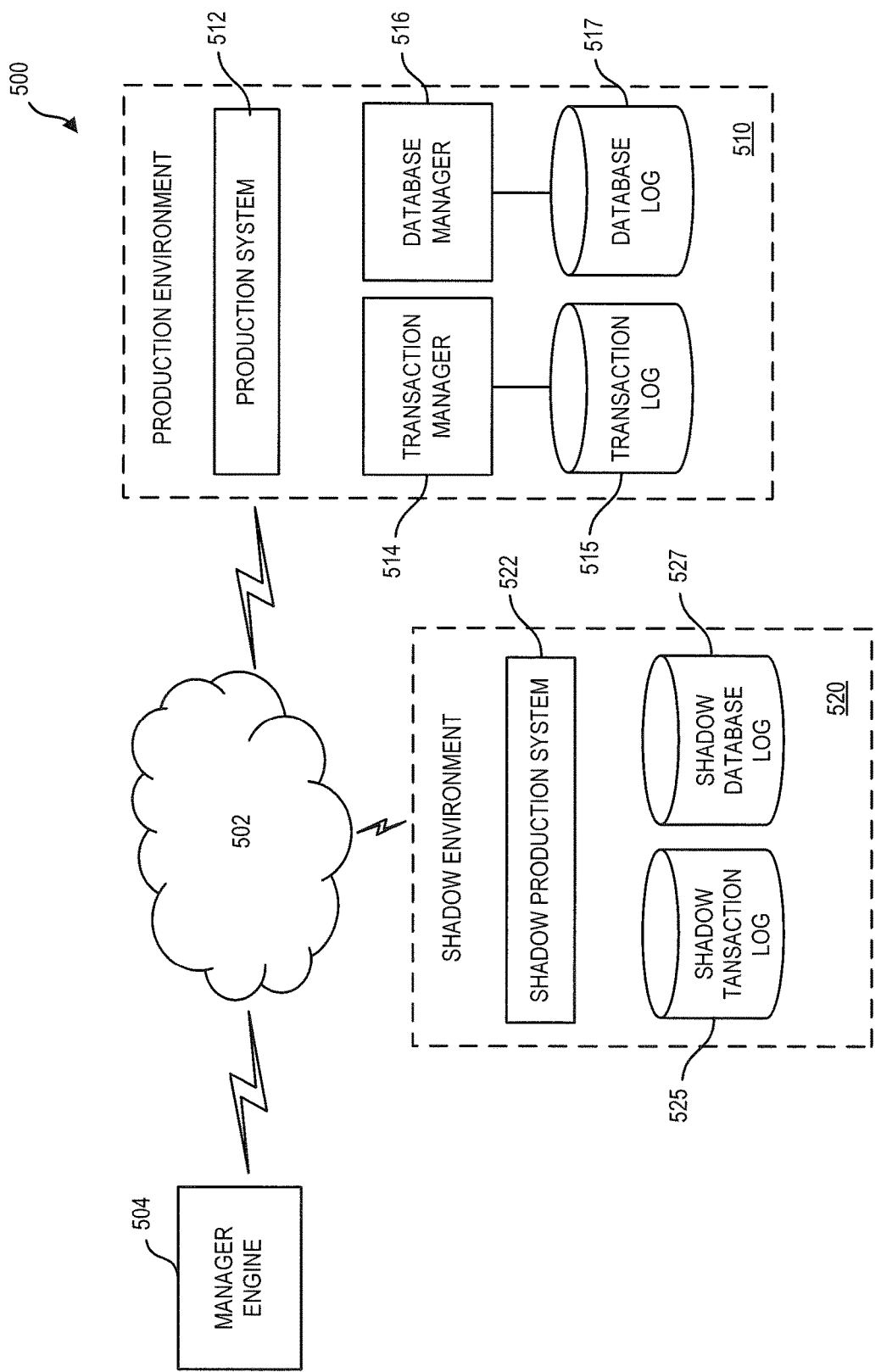
FIG. 5 is an exemplary block diagram of a system, in accordance with one or more aspects set forth herein.

FIG. 5 is an exemplary block diagram of a system 500, in accordance with one or more aspects set forth herein. In the embodiment of FIG. 5, system 500 includes numerous devices, which may be or include computing nodes 10 as previously described, connected by a network 502. For example, network 502 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which a manager engine 504 can perform a test to determine the prospective effect of a software upgrade on a production environment 510 which can include a production system 512 a transaction manager 514 and a production database manager 516. For performance of a test, a manager engine 504 can establish a shadow environment 520 having a shadow production system 522 a shadow transaction log 525 and a shadow database log 527.

For performance of a test, manager engine 504 can feed test instructions into shadow production system 522. For determining of the test instructions, manager engine 504 can modify transactions of a shadow transaction log 525 which log can be a copy of a production system transaction log 515 (production transaction log 515). The modifying can include using data of shadow database log 527 which can be a copy of production database log 517. For inputting of test transactions, manager engine 504 can perform a process to assure that test transactions are fed into a shadow production system 522 on a one transaction at a time basis. Manager engine 504 can input a set of test transactions into shadow production system 522 in a pre-upgrade state and obtain first results, can input a set of test transactions into shadow production system 522 in a post-upgrade state and obtain second results, and can compare the first and second results.

Figure 6:
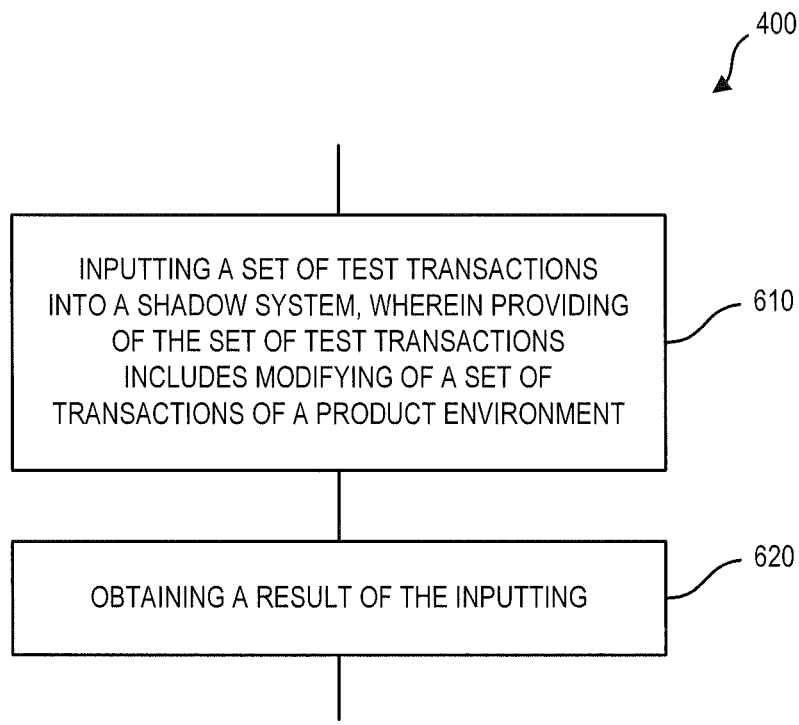
FIG. 6 is a flow diagram illustrating a method including determining of a test transaction based on a production system transition, in accordance with one or more aspects set forth herein.

FIG. 6 depicts a method for use in performing a test. By way of example, the method described with respect to FIG. 6 can be performed using one or more program 440 running on one or more device 504 (FIG. 5), as detailed with respect to FIG. 4.

Referring to the flow diagram of FIG. 6 one or more program 440 at block 610 can perform inputting a set of test transactions into a shadow production system 522, wherein providing of the a set of test transactions includes modifying of set of transactions of a production environment. A set of transactions e.g., test transactions herein can include one or more transaction. At block 620 one or more program 440 can obtain a result of the inputting.

Figure 7:
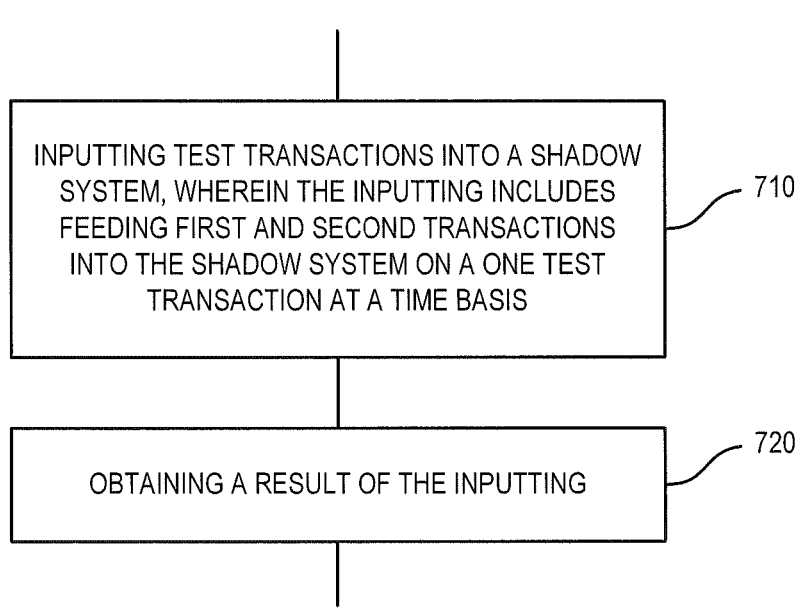
FIG. 7 is a flow diagram illustrating a method including feeding test transactions into a shadow production system on a one test transaction at a time basis, in accordance with one or more aspects set forth herein.

FIG. 7 depicts a method for use in performing a test. By way of example, the method described with respect to FIG. 7 can be performed using one or more program 440 on one or more device 504 (FIG. 5), as detailed with respect to FIG. 4.

Referring to the flow diagram of FIG. 7 one or more program 440 at block 710 can perform inputting test transactions into a shadow production system 522, wherein the inputting includes feeding first and second test transactions into the shadow production system 522 on a one test transaction at a time basis; and at block 720 one or more program 440 can perform obtaining a result of the inputting.

Figure 8:
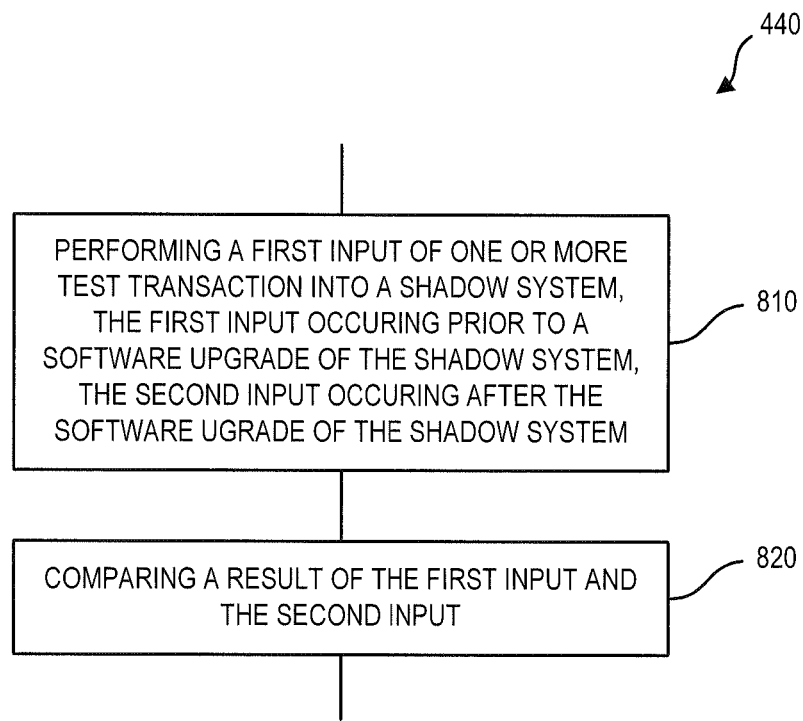
FIG. 8 illustrates a method including inputting a test transaction into a pre-upgrade shadow production system and a post-upgrade shadow production system, in accordance with one or more aspects set forth herein.

FIG. 8 depicts a method for use in performing a test. By way of example, the method described with respect to FIG. 8 can be performed using one or more program 440 on one or more device 504 (FIG. 5), as detailed with respect to FIG. 4.

Referring to the flow diagram of FIG. 8 one or more program 440 at block 810 can perform a first input of a set of test transactions into a shadow production system 522 and a second input of the a set of test transactions into the shadow production system 522, the first input occurring prior to a software upgrade of the shadow production system 522, the second input occurring after the software upgrade of the shadow production system 522; and at block 820 one or more program 440 can perform comparing a result of the first input and the second input.

Figure 9A:
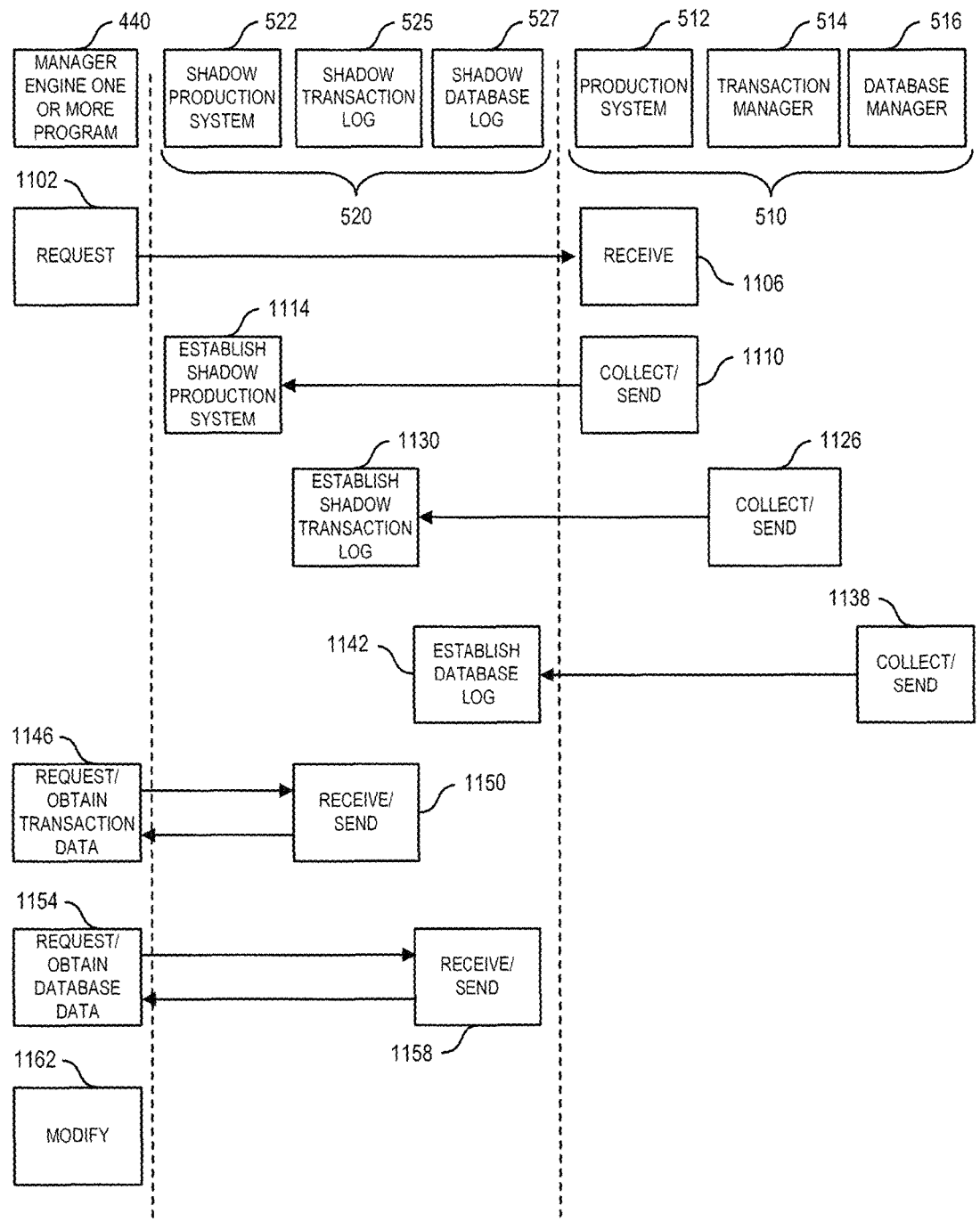
FIGS. 9A-9B is a flow diagram illustrating performance of a method for testing a software upgrade, in accordance with one or more aspects set forth herein.
Figure 9B:
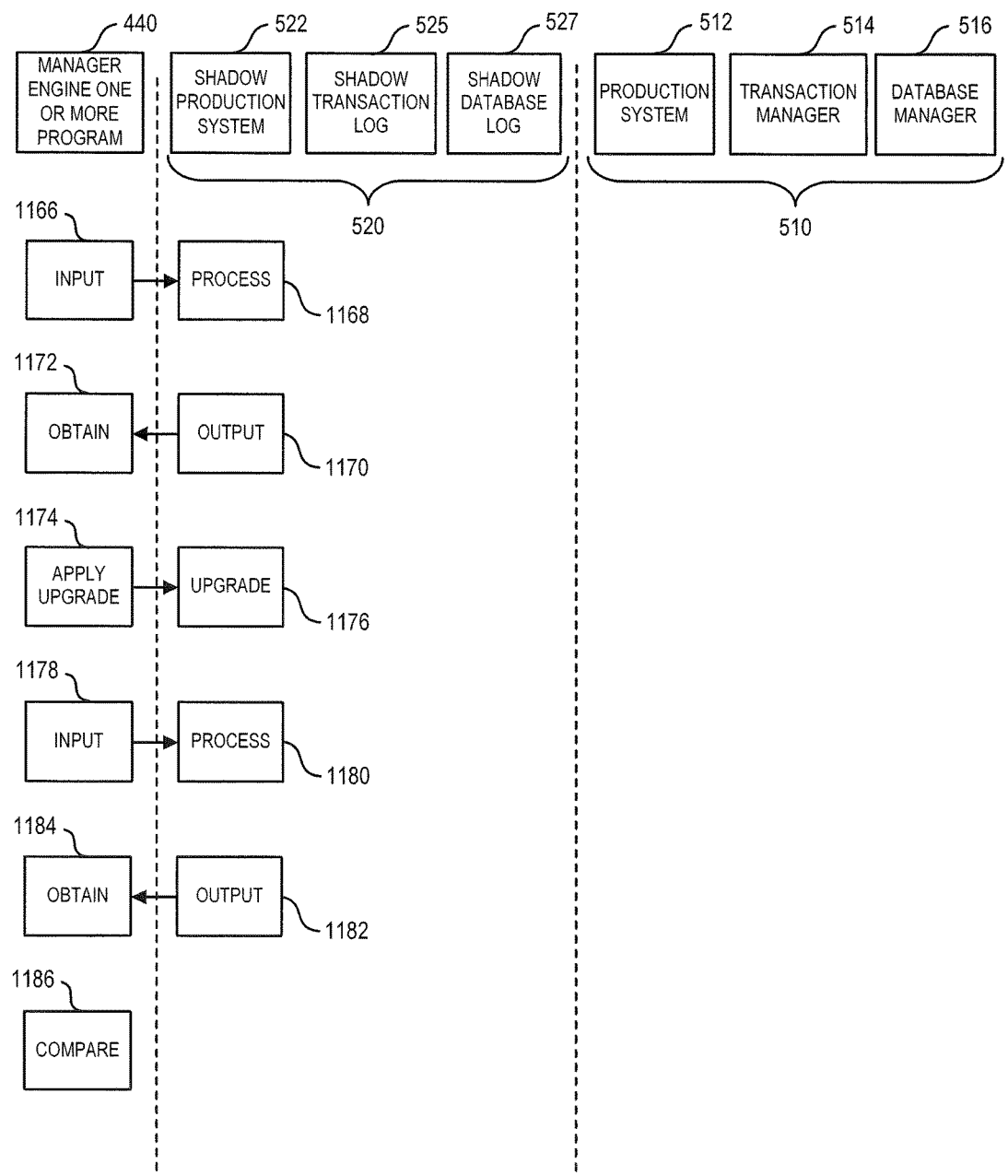

FIGS. 9A-9B are diagrams illustrating further aspects of a process for testing a software upgrade to determine a prospective effect of performing a software upgrade on a protective environment. By way of explanation, in FIGS. 9A-9B, processes are illustrated from the point of view of a manager engine one or more program 440 (e g, running on manager engine 504 of FIG. 5), a production environment 510 and a shadow environment 520. Production environment 510 can include a production system 512, a transaction manager 514 that outputs a production system transaction log 515, and a database manager 516 that outputs a production database log 517. Shadow environment 520 can include a shadow production system 522, a shadow transaction log 525 and a shadow database log 527. Production system 512 can include one or more database and database manager 516 can manage updating of the one or more database of production system 512. For performance of a test, one or more program 440 can feed test instructions into shadow production system 522. For determining of the test instructions, manager one or more program 440 can modify transactions of a shadow transaction log 525, which transaction log can be a copy of production system transaction log 515 Transactions can be re-ordered based on content of a shadow database log 527 which can be a copy of production database log 517.

Production environment 510 can be provided using e.g. a server system having one or more processor. In one embodiment, one or more program for providing functionality of transaction manager 514 can be run on a first processor of the server system, one or more program for providing functionality of database manager 516 can be run on a second processor of the server system and one or more program for providing additional functionality such as database functionality can be run on one or more additional processor of the server system.

Production environment 510 can provide support for any purpose, e.g., running of factory process machinery, performing banking or retail transactions, processing, web hosting and/or database hosting applications.

In one embodiment, shadow environment 520 can be provided using a target infrastructure having hardware elements corresponding to hardware elements of production environment, e.g., in terms of one or more of processor count or speed.

In one embodiment, shadow environment can be provided using a target infrastructure dissimilar to that of production environment.

Transactions that can be processed by production environment 510 and shadow environment 520 can be provided in one embodiment by messages having data that is subject to processing and which is used for keying and updating databases of production system 512 and shadow production system 522.

In one embodiment, one or more program 440 can run on a different collection of physical or virtual machines or processors, depending on the need for scalability of the system. In one specific example, one or more program 440 can run on a single multiprocessor server system. In another specific example, various portions of manager engine one or more program 440 may run on different processors running on different computing nodes.

In one or more embodiments, manager engine one or more program 440 at block 1102 can send to production environment 510 a request to establish a shadow production system 522. At block 1106 production system 512 can receive the request sent at block 1102. Responsively to the request of block 1102, production system 512 at block 1110 can collect production system information according to the request and at block 110 can send the collected information to a target infrastructure. At block 1114 a shadow production system 522 can be established.

Further, responsively to the request of block 1102 transaction manager 514 at block 1126 can collect transaction log information and at block 1126 can send collected information to a target infrastructure. A shadow transaction log 525 can be established at block 1130.

Further responsively to the request of block 1102 database manager 516 at block 1138 can collect database transaction log information and at block 1138 can send collected information to a target infrastructure. A shadow database log 527 can be established at block 1142.

At block 1146 one or more program 440 can request and obtain information of a shadow transaction log 525. At block 1150 shadow transaction log 525 can receive the request and send the requested information. Also at block 1146 one or more program 440 can make a single time copy of databases of production system 512. A single time copy of databases of production system 512 records data of production system databases in a common database time to achieve data consistency among databases.

At block 1154 one or more program 440 can request and obtain information of shadow database log 527. At block 1158 shadow database log 527 can receive the request and send the requested information.

One or more program 440 at block 1162 can modify a set of transactions to determine a set of test transactions based on obtained information obtained at block 1146 and block 1154. Transactions modified by one or more program 440 can be transactions of the production system transaction log 515 copied to provide shadow transaction log 525. For modification of set of transactions in one aspect, one or more program 440 can use content of a production database log 517 as copied to provide shadow database log 527 so that the modification of transactions is based on content of production database log 517. In one embodiment, one or more program 440 at block 1162 can determine an order or a test transactions based on an order of commitments of a production database log 517. An order of commitments of a production database can be specified in production database log 517 which can be copied to provide shadow database log 527. One or more program 440 at block 1162 can re-order transactions of a shadow transaction log 525 as copied from transaction log 515 (and therefore of transaction log 515) so that a defined set of test transactions are in an order of commitments of a shadow database log 527 as copied from production database log 517.

At block 1162 one or more program 440 can modify set of transactions obtained at block 1146 to determine a set of test transactions. In one aspect one or more program 440 at block 1162 to modify set of transactions can use content of production database log 517 as obtained from shadow database log 527 at block 1154. More specifically, at block 1162 one or more program 440 can modify an order of transactions in the determination of test transaction so that the determined a set of test transactions have an order based on an order of commitments of transactions of production database log 517.

Transaction log 515 and shadow transaction log 525 can include a record of transactions that have been processed by production system 512. The record of transactions can be a record of transaction in the order of their input into production system 512. However, it was determined that production system 512 may not perform transactions in the order of transactions of transaction log 515. It was determined than an order of commitments of production database log 517 can represent an order of performance of transactions performed by production system 512.

More specifically, it was determined that because database manager 516 can manage updating databases of production system 512, database manager 516 can output information indicating an order that production system 512 performs transactions. It was determined that problems can arise with a test if a test is performed using an order of transactions in an order other than an order in which they are performed. For example, a test in a shadow environment 520 may produce different results if data is obtained from a database of shadow production system 522 that has not been updated according the same sequence as in the production system 512. Database manager 516 of production environment 510 can be provided to output a production database log 517 that specifies an order of commitments to updates performed by database manager 516. It was determined that using an order of commitments of production database log 517 which can be copied to provide shadow database log 527 to determine an order of test transactions, the databases of shadow production system 522 can be provided to have content consistent with databases of production system 512.

One or more program 440 at block 1162 can perform one or more transaction modification function in addition to or in place of a transaction modification to change an order of a transaction.

In one aspect, one or more program 440 at block 1162 can perform an edit function for editing one or more transaction. An edit function can be e.g. an automated edit function or a batch edit function wherein one or more transaction can be edited based on user defined data. One or more program 440 can perform a batch edit function to edit one or more transaction based on user defined data. Prior to input of a set of test transactions into shadow production system 522 one or more program 44 can output e.g. to display 24 a preview set of test transactions and can permit an administrator to define user defined data for editing of one or more test transaction.

In one aspect one or more program at block 1162 can perform a delete function for deleting one or more transaction. A delete function can be e.g. an automated delete function or a batch delete function wherein one or more transaction can be deleted based on user defined data. One or more program 440 can perform a batch delete function to delete one or more transaction based on user defined data. Prior to input of a set of test transactions into shadow production system 522 one or more program can output e.g. to display 24 a preview set of test transactions and can permit an administrator to define user defined data for deleting of one or more test transaction.

Performance of block 1162 wherein one or more program 440 can modify a set of test transactions can be enhanced with use of a pretest. According to a pretest function one or more program 440 at block 1162 can perform pretest by inputting a set of test transactions to shadow production system 522 and outputting results which shadow production system 522 and result can be configured so that transaction formatting errors are checked for. In performance of a pretest, shadow production system 522 can output a format error report. Using a batch edit or delete function as set forth herein, an administrator can define user defined data for processing by one or more program 440 at block 1162 for modification of one or more test transaction. Transaction formatting errors can include, e.g., syntax errors, logic operand errors. A production system 512 can have multiple applications (e.g., tens to hundreds) running on multiple operating systems and/or multiple servers, and it may be impractical to replicate each application into shadow production system 522. Because of differences between shadow production system 522 and production system 512, transactions processed in production system 512 may return error messages when input into shadow production system 522. A pretest function of one or more program 440 at block 1162 can be used to identify such transactions that will return errors. One or more program 440 can restrict such error producing transactions from being used as test transactions at block 1166.

In one aspect, an example of a method set forth in reference to FIG. 6 including modifying of a set of test transactions is set forth in reference to block 1162.

At block 1166 one or more program 440 can input a set of test transactions determined at block 1162 into shadow production system 522 which can process the set of test transactions at block 1168. The inputting of one or test transaction at block 1166 can include preparing a set of test transactions so that successive transactions of the one or more transaction are input on a one transaction at a time basis. To assure that the test transactions are input on a one transaction at a time basis, one or more program 440 at block 1166 can perform a check process. The inputting of one or test transaction at block 1166 can include preparing the set of test transactions so that successive transactions are performed in the order determined at block 1162. To assure that the test transactions are input in the order determined at block 1162, one or more program 440 at block 1166 can perform a timing process. Also at block 1166 one or more program 440 can restore to shadow production system 522 the single time copy of production system databases made at block 1146. The restoring can be performed so that database data can be returned to baseline data values in order to facilitate improved examination of an effect of a test transaction input.

In one aspect, an example of a method set forth in reference to FIG. 7 including inputting a set of test transactions on a one transaction at a time basis is set forth in reference to block 1166.

One or more program 440 at block 1166 can assure that a set of test transactions are performed on a one transaction at a time basis using the following described check process. At block 1166 one or more program 440 can restrict input of each new test transaction into shadow production system 522 of a succession of test transactions until one or more program 440 confirms that an immediately prior transaction of a succession of test transaction has been completed. To perform such confirmation one or more program 440 can examine shadow production system 522 for output of an output message. When an output message has been received, one or more program 440 can determine that an input transaction provided by an input message has been complete.

One or more program 440 at block 1166 can assure that a set of test transactions can be performed in the order determined at block 1162 using the following described timing process. On the determination of test transactions at block 1162 a set of test transactions can have associated time commitments as determined from shadow database log 527 at block 1154. A set of test transactions can be organized in chronological order based on the order of the corresponding transactions of production database 517 determined from shadow database log 527. A timing process at block 1166 can include initially setting a system time of the shadow production system 522 to a time of commitment of a first transaction of a set of successive test transactions. An inputting of a certain transaction of the set of successive test transactions can include: (a) determining if a current system time is earlier than the time of commitment of the certain transaction; and (b) if yes, holding an inputting of the certain transaction until the system time is equal to or later than the commitment time for the certain transaction and then perform the certain transaction.

At block 1166 one or more program 440 can perform the following process: (1) pick up one input message in the transaction simulation; (2) check the current system time; (3) if the current system time is earlier than the time of commitment of the input message, hold the input until the system time is equal to or later than the commitment time; (4) send the input message to the shadow production system; (5) complete processing of the input message in the shadow production system; (6) receive an output message for the input message in the transaction simulator; (7) return to (1). Functions (2) through (4) can be regarded as an example of a timing process herein. Functions (5) through (6) can be regarded as a check process herein. A timing process and a check process can be can increase and accuracy with which and effect of a software upgrade can be identified.

At block 1170 shadow production system 522 can output test results and at block 1172 one or more program 440 can obtain the test results of inputting the a set of test transactions at block 1166.

At block 1174 one or more program 440 can apply a software upgrade to shadow production system 522. At block 1176 upgrading of shadow production system 522 can be completed so that shadow production system 522 includes upgraded software.

At block 1178 one or more program 440 can input a set of test transactions to shadow production system 522 upgraded to include upgraded software, which shadow production system 522 can process the set of transactions (block 1180). The set of test transactions can be a same set of test transaction as applied to the shadow production system 522 at block 1166 prior to the shadow production system being upgraded. Also at block 1178 to facilitate improved examination of an effect of a test transaction input, one or more program 440 can restore to shadow production system 522 the single time copy of production system databases made at block 1146.

In one aspect an example of a method set forth in reference FIG. 8 including inputting a set of test transactions to a pre-upgrade shadow production system and a post-upgrade production system is set forth in reference to blocks 1166 and 1178.

One or more program 440 at block 1178 can perform a check and a timing process as performed at block 1166 to assure that test transactions can be performed on a one transaction at a time basis and also to assure the test transactions can be performed in the order that can be determined at block 1162.

A check process at block 1178 can be according to the check process set forth in reference to block 1166. A check process can include one or more program 440 examining an output of shadow production system 522 to confirm that an immediately prior transaction of a set of transactions has been complete prior to performance of a next transaction of a set of transactions.

A timing process at block 1178 can be according to a timing process set forth in reference to block 1166 and can include initially setting a system time of the shadow production system 522 to a time of commitment of a first transaction of a set of successive test transactions. An inputting of a certain transaction of the set of successive test transactions can include: (a) determining if a current system time is earlier than the time of commitment of the certain transaction; and (b) if yes, holding an inputting of the certain transaction until the system time is equal to or later than the commitment time for the certain transaction and then perform the certain transaction.

At block 1182 shadow production system 522 can output test results and at block 1184 one or more program 440 can obtain the test resulting from inputting the a set of test transactions at block 1178.

At block 1186 one or more program 440 can perform comparing a result obtained at block 1172 to a result obtained at block 1184 and at block 1184 one or more program 440 can output a result of comparing.

It has been noted that test transactions input into shadow production system 522 post-upgrade at block 1178 can be the same as test transactions as are input into the shadow production system 522 pre-upgrade at block 1160. The common test transactions can be indexed, e.g., by one or more of transaction serial numbers or key numbers of production database log 517 as obtained from shadow database log 527.

In one aspect the comparing by one or more program 440 at block 1166 can include comparing of output messages of transactions archived in a management database at block 1172 (result of input test transaction pre-upgrade) and at block 1184 (result of input test transactions post-upgrade). The output messages of transactions obtained at block 1172 and block 1184 can be compared line by line in text format and a result of a comparison can be written in a on line detailed report. A number of mismatches can be included in a summary report.

In FIG. 10 there is illustrated a report, reporting a mismatch identified in a comparison of output messages resulting from input of a test transaction to a shadow production system 522 in a pre-upgrade and post-upgrade state. By comparing results of inputs to a shadow production system 522 in a pre-upgrade and post-upgrade state, effects of a software upgrade may be more easily identified as being effects of a software upgrade. Instances of an effect that is actually a result of differences between a production system and a shadow production system being misidentified as an effect of a software upgrade can be avoided. Features herein can improve accuracy in the identification of effects of a software upgrade.

In one aspect, comparing by one or more program 440 at block 1186 can include comparing unloaded sequential files of user databases using a compare tool. It was determined that a software upgrade can impact content of one or more database of production system 512. Accordingly, it was determined that one or program 440 comparing content of databases of shadow production system 522 before and after an upgrade can provide useful results. For examination of content of a shadow production system database, one or more program 440 can perform unloading of a database. At block 1172 (result of inputting test transactions to pre-upgraded shadow production system) there can be obtained an output of unloaded sequential files of user databases. At block 1184 (result of inputting test transactions to post-upgraded shadow production system) there can be obtained an output of unloaded sequential files of user databases. At block 1186 the unloaded sequential database results can be compared. If differences are detected the name of the relevant database, the record number, and the contents of the data before and after the comparison and the mismatching content can be included in a detailed report. One or more program 440 can include numbers of mismatches in an output report.

In FIG. 11 there is illustrated a report, reporting a mismatch identified in a comparison of user database unloaded files resulting from input of a test transaction to a shadow production system 522 in a pre-upgrade and post-upgrade state.

In one aspect, comparing by one or more program 440 at block 1186 can include comparing CPU use times. At block 1172 (result of inputting test transactions to pre-upgraded shadow production system) one or more program 440 can obtain a CPU use time for processing that set of test transactions input at block 1166. At block 1184 (result of inputting test transactions to post-upgraded shadow production system) one or more program 440 can obtain a CPU use time for processing the set of test transactions input at block 1178. In one embodiment, the CPU use times can include cumulative CPU use times for all CPUs (if more than one) involved in performance of a transaction. The result of the CPU comparison performed at block 1186 can be written in a one line detail report. The performance data can include a certain amount of error according to ordinary processing tolerances. An allowable error, e.g., 10%, 20% can be defined. A comparing of CPU processing time can be performed for each transaction of the set of test transaction input at block 1166 and again at block 1178.

In FIG. 12 there is illustrated a report summarizing mismatches identified in a comparison of CPU usage time resulting from input of a test transaction to a shadow production system 522 in a pre-upgrade and post-upgrade state.

In FIG. 13 there is illustrated an exemplary summary report summarizing results of comparing of pre-upgrade and post-upgrade test transaction results in respect to output messages, user database unloaded files, and CPU usage time.

At block 1184 there can be performed a comparing of a result of a post-upgrade transaction input to a result of a pre-upgrade transaction input. In another embodiment blocks 1166, 1168, 1170, and 1170 can be deleted and a comparing by one or program 440 at block 1186 can be performed between (a) a result of applying a set of test transactions to shadow production system 522 in a post-upgrade state and (b) a result of applying a set of transactions to production system 512. Deleting blocks 1166, 1168, 1170, and 1170 can provide a quicker and more simply performed test. It was determined that content of shadow production system 522 can be different from production system 512. For example in some embodiments a production system 512 can include multiple related applications running on different operating systems and/or different servers. It may not be practical in some instances to replicate each application in the shadow production system.

It was determined, that where results from a shadow production system are compared to results obtained from a production system, differences can be attributable between differences in the shadow production system and production system and not to differences resulting from the software upgrades. It was determined, that a method herein wherein post-upgrade and pre-upgrade test transaction input results can be compared can benefit the identification of risks that are attributable to the software upgrade for the reason that differences determined will not be attributable differences between the shadow production system and the production system.

A small sample of apparatus systems and methods set forth herein include the following:

There is set forth herein: (A1) A method comprising: inputting, by one or more processor, a set of test transactions into a shadow production system, wherein providing of the set of test transactions includes modifying of a set of transactions of a production environment; and obtaining, by the one or more processor, a result of the inputting. (A2) The method of (A1), wherein the modifying includes ordering the set of test transactions based on an order of commitments of a database log. (A3) The method of (A1), wherein the modifying includes editing one or more transaction. (A4) The method of (A1), wherein the modifying includes performing, by the one or more processor, a pre-test by inputting one or more test transaction to determine a formatting error of the one or more transaction. (A5) The method of (A1), wherein the method includes initially setting a system time of the shadow production system to a time of commitment of a first transaction of a set of successive test transactions, and wherein inputting of a certain transaction of the set of successive test transactions includes: (a) determining if a current system time is earlier than the time of commitment of the certain transaction; and (b) if yes, holding an inputting of the certain transaction until the system time is equal to or later than the commitment time for the certain transaction and then perform the certain transaction.

There is also set forth herein: (B1) A system comprising: a memory one or more processor in communication with the memory; and program instructions executable by the one or more processor via the memory to perform a method for controlling display of an image on a display screen, the method comprising: inputting, by one or more processor, a set of test transactions into a shadow production system, wherein providing of the set of test transactions includes modifying of set of transactions of a production environment; and obtaining, by the one or more processor, a result of the inputting. (B2) The system of B1, wherein the modifying includes ordering the test transactions based on an order of commitments of a database log. (B3) The system of (B1), wherein the modifying includes editing one or more transaction. (B4) The system of (B1), wherein the modifying includes performing, by the one or more processor, a pre-test by inputting one or more test transaction to determine an error of the one or more transaction. (B5) The system of (B1), wherein the method includes initially setting a system time of the shadow production system to a time of commitment of a first transaction of a set of successive test transactions, and wherein inputting of a certain transaction of the set of successive test transactions includes: (a) determining if a current system time is earlier than the time of commitment of the certain transaction; and (b) if yes, holding an inputting of the certain transaction until the system time is equal to or later than the commitment time for the certain transaction and then perform the certain transaction.

There is also set forth herein: (C1) A computer program product comprising: a computer readable storage medium readable by one or more processing unit and storing instructions for execution by the one or more processing unit for performing a method for controlling display of an image on a display screen, the method comprising: inputting, by one or more processor, a set of test transactions into a shadow production system, wherein providing of the set of test transactions includes modifying of set of transactions of a production environment; and obtaining, by the one or more processor, a result of the inputting. (C2) The computer program product of (C1), wherein the modifying includes ordering the test transactions based on an order of commitments of a database log. (C3) The computer program product of (C1), wherein the modifying includes editing one or more transaction. (C4) The computer program product of (C1), wherein the modifying includes performing, by the one or more processor, a pre-test by inputting one or more test transaction to determine an error of the one or more transaction. (C5) The computer program product of (C1), wherein the method includes initially setting a system time of the shadow production system to a time of commitment of a first transaction of a set of successive test transactions, and wherein inputting of a certain transaction of the set of successive test transactions includes: (a) determining if a current system time is earlier than the time of commitment of the certain transaction; and (b) if yes, holding an inputting of the certain transaction until the system time is equal to or later than the commitment time for the certain transaction and then perform the certain transaction.

There is also set forth herein: (D1) A method comprising: inputting, by one or more processor, test transactions into a shadow production system, wherein the inputting includes feeding first and second test transactions into the shadow production system on a one test transaction at a time basis; and obtaining, by the one or more processor, a result of the inputting.

There is also set forth herein: (E1) A method comprising: inputting, by one or more processor, test transactions into a shadow production system, wherein the inputting includes initially setting a system time of the shadow production system to a time of commitment of a first transaction of a set of successive test transactions, and wherein inputting of a certain transaction of the set of successive test transactions includes: (a) determining if a current system time is earlier than the time of commitment of the certain transaction; and (b) if yes, holding an inputting of the certain transaction until the system time is equal to or later than the commitment time for the certain transaction and then perform the certain transaction; and obtaining, by the one or more processor, a result of the inputting.

There is also set forth herein: (F1) A method comprising: performing, by one or more processor, a first input of a set of test transactions into a shadow production system and a second input of the a set of test transactions into the shadow production system, the first input occurring prior to a software upgrade of the shadow production system, the second input occurring after the software upgrade of the shadow production system; and comparing, by the one or more processor, a result of the first input and the second input. (F2) The method of (F1), wherein the comparing includes comparing output message results of the first input and the second input. (F3) The method of (F1), wherein the comparing include comparing unloaded database content results of the first input and the second input. (F4) The method of (F1), wherein the comparing includes comparing CPU execution time results of the first input and the second input. (F5) The method of (F1), wherein the comparing includes comparing output message results, unloaded database results and CPU execution time results of the first input and the second input.

There is also set forth herein: (G1) A system comprising: a memory; one or more processor in communication with the memory; and program instructions executable by the one or more processor via the memory to perform a method for controlling display of an image on a display screen, the method comprising performing a first input of a set of test transactions into a shadow production system and a second input of the a set of test transactions into the shadow production system, the first input occurring prior to a software upgrade of the shadow production system, the second input occurring after the software upgrade of the shadow production system; and comparing a result of the first input and the second input. (G2) The system of (G1), wherein the comparing includes comparing output message results of the first input and the second input. (G3) The system of (G1), wherein the comparing include comparing unloaded database content results of the first input and the second input. (G4) The system of (G1), wherein the comparing includes comparing CPU execution time results of the first input and the second input. (G5) The system of (G1), wherein the comparing including comparing output message results, unloaded database results and CPU execution time results of the first input and the second input.

There is also set forth herein: (H1) A computer program product comprising: a computer readable storage medium readable by one or more processing unit and storing instructions for execution by the one or more processing unit for performing a method, the method comprising: performing a first input of a set of test transactions into a shadow production system and a second input of the a set of test transactions into the shadow production system, the first input occurring prior to a software upgrade of the shadow production system, the second input occurring after the software upgrade of the shadow production system; and comparing a result of the first input and the second input. (H2) The computer program product of (H1), wherein the comparing includes comparing output message results of the first input and the second input. (H3) The computer program product of (H1) wherein the comparing include comparing unloaded database content results of the first input and the second input. (H4) The computer program product of (H1), wherein the comparing includes comparing CPU execution time results of the first input and the second input. (H5) The computer program product of (H1), wherein the comparing including comparing output message results, unloaded database results and CPU execution time results of the first input and the second input.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   performing, by one or more processor, a first input of a set of test transactions into a shadow production system and a second input of the set of test transactions into the shadow production system, the first input occurring prior to a software upgrade of the shadow production system, the second input occurring after the software upgrade of the shadow production system; and
   comparing, by the one or more processor, a result of the first input and the second input, wherein the performing the first input of the set of test transactions includes initially setting a system time of the shadow production system to a time of commitment of a first transaction of a set of successive test transactions defining the set of test transactions, and wherein inputting of a certain transaction of the set of successive test transactions includes: (a) determining that a current system time is earlier than the time of commitment of the certain transaction; and (b) responsively holding an inputting of the certain transaction until the system time is equal to or later than the commitment time for the certain transaction and then perform the certain transaction; and wherein the method includes obtaining, by the one or more processor, a result of the inputting.

2. The method of claim 1, wherein the comparing includes comparing output message results of the first input and the second input.

3. The method of claim 1, wherein the comparing includes comparing unloaded database content results of the first input and the second input.

4. The method of claim 1, wherein the comparing includes comparing CPU execution time results of the first input and the second input.

5. The method of claim 1, wherein the comparing includes comparing output message results, unloaded database results and CPU execution time results of the first input and the second input.

6. The method of claim 1, wherein providing of the set of test transactions includes modifying of a production environment set of transactions of a production environment, and wherein the method includes obtaining, by the one or more processor, a result of the inputting.

7. The method of claim 6, wherein the modifying includes ordering the set of test transactions based on an order of commitments of a database log.

8. The method of claim 6, wherein the modifying includes editing one or more transaction.

9. The method of claim 6, wherein the modifying includes performing, by the one or more processor, a pre-test by inputting one or more test transaction to determine a formatting error of the one or more transaction.

10. The method of claim 1, wherein the method includes initially setting a system time of the shadow production system to a time of commitment of a first transaction of a set of successive test transactions defining the set of test transactions, and wherein inputting of a certain transaction of the set of successive test transactions includes: (a) determining that a current system time is earlier than the time of commitment of the certain transaction; and (b) responsively holding an inputting of the certain transaction until the system time is equal to or later than the commitment time for the certain transaction and then perform the certain transaction.

11. The method of claim 1, wherein the performing the first input of the set of test transactions into the shadow production system includes feeding first and second test transactions into the shadow production system on a one test transaction at a time basis, and obtaining, by the one or more processor, a result of the inputting.

12. The method of claim 1, further comprising providing an output in response to the comparing that indicates an effect of the software upgrade.

13. The method of claim 1, further comprising providing an output in response to the comparing, wherein the output indicates to a user a risk associated with upgrading a production environment according the software upgrade.

14. The method of claim 1, further comprising providing an output in response to the comparing, wherein the output indicates an effect of the software upgrade, and wherein the method includes implementing the software upgrade in a production environment based on the providing an output.

15. A system comprising:
   a memory;
   one or more processor in communication with the memory; and
   program instructions executable by the one or more processor via the memory to perform a method, the method comprising:
      performing a first input of a set of test transactions into a shadow production system and a second input of the set of test transactions into the shadow production system, the first input occurring prior to a software upgrade of the shadow production system, the second input occurring after the software upgrade of the shadow production system; and
      comparing a result of the first input and the second input, wherein the performing the first input of the set of test transactions includes initially setting a system time of the shadow production system to a time of commitment of a first transaction of a set of successive test transactions defining the set of test transactions, and wherein inputting of a certain transaction of the set of successive test transactions includes: (a) determining that a current system time is earlier than the time of commitment of the certain transaction; and (b) responsively holding an inputting of the certain transaction until the system time is equal to or later than the commitment time for the certain transaction and then perform the certain transaction; and wherein the method includes obtaining a result of the inputting.

16. The system of claim 15, wherein the comparing includes comparing output message results of the first input and the second input.

17. The system of claim 15, wherein the comparing includes comparing unloaded database content results of the first input and the second input.

18. A computer program product comprising:
a computer readable storage medium readable by one or more processing circuit and storing instructions for execution by one or more processor for performing a method, the method comprising:
performing a first input of a set of test transactions into a shadow production system and a second input of the set of test transactions into the shadow production system, the first input occurring prior to a software upgrade of the shadow production system, the second input occurring after the software upgrade of the shadow production system; and
comparing a result of the first input and the second input, wherein the performing the first input of the set of test transactions includes initially setting a system time of the shadow production system to a time of commitment of a first transaction of a set of successive test transactions defining the set of test transactions, and wherein inputting of a certain transaction of the set of successive test transactions includes: (a) determining that a current system time is earlier than the time of commitment of the certain transaction; and (b) responsively holding an inputting of the certain transaction until the system time is equal to or later than the commitment time for the certain transaction and then perform the certain transaction; and wherein the method includes obtaining a result of the inputting.

* * * * *